Aug. 12, 1941.  J. A. J. BENNETT  2,252,544
AIRCRAFT HAVING ROTATIVE SUSTAINING WINGS OR BLADES
Original Filed April 30, 1938  5 Sheets-Sheet 5

INVENTOR.
James Allan Jamieson Bennett
BY
Synnestvedt & Lechner
ATTORNEYS

Patented Aug. 12, 1941

2,252,544

UNITED STATES PATENT OFFICE 2,252,544

AIRCRAFT HAVING ROTATIVE SUSTAINING WINGS OR BLADES

James Allan Jamieson Bennett, Esher, England, assignor, by mesne assignments, to Autogiro Company of America, a corporation of Delaware Application April 30, 1938, Serial No. 205,352
Renewed July 20, 1939
In Great Britain April 30, 1937

23 Claims.  (Cl. 244—18)

This invention relates to aircraft having rotative sustaining wings or blades, and more particularly to aircraft sustaining rotors in which the blades are articulated to a generally upright hub in a manner providing for conjoint lag-lead and pitch change movements.

While many features of the invention are applicable to aircraft of this general type capable of operation as helicopters, the invention is of special utility in an aircraft having a sustaining rotor capable of autorotational actuation in flight and provided with driving means for rotating the rotor prior to take-off with the blades thereof at a low or zero pitch setting, the speed of rotation preferably being carried beyond the normal autorotational rate, so as to store kinetic energy in the rotor which may subsequently be utilized by disconnecting the drive and raising the blade pitch so as to produce a high initial thrust and thereby effect direct or substantially vertical take-off.

One of the primary objects of the invention is involved in the provision of a novel blade pivot arrangement providing for decrease of blade pitch upon lagging thereof and increase of blade pitch upon leading, especially in association with a drive mechanism for the rotor connected with the blades thereof in such manner as to impose a lagging and pitch decreasing moment thereon sufficient to maintain the blades in lagging (and therefore reduced pitch) position even when driving the rotor at rates of rotation higher than the normal autorotational rate. In this connection it may be noted that the mounting pivot means for the blades preferably incorporates one or more pivot axes which are offset from the rotational axis of the hub so that the action of centrifugal force sets up a restoring moment tending to maintain the blades in substantially true radial positions. In accordance with the invention, the lagging moment imposed by application of the drive is sufficient to overcome the centrifugal restoring moment even at high rates of rotation, as aforesaid.

The pivotal mounting employed in accordance with the invention preferably includes a lag-lead pivot, the axis of which is inclined upwardly and outwardly with reference to the longitudinal axis of the blade, this pivot axis making a relatively small acute angle with the hub axis with a view to improving the aerodynamic characteristics of the rotor in normal flight as compared with certain prior arrangements (for various reasons which need not be considered in detail at this point). Such inclination of the lag-lead pivot axis, however, necessitates a larger blade lag to provide a given pitch reduction, as compared with an arrangement in which the lag-lead pivot axis makes a larger angle with the hub axis and, in consequence, with any substantial degree of offset of this pivot axis from the hub axis, driving of the rotor merely by imparting torque to the hub is insufficient to maintain the blade in full lagging position as against the restoring moment of centrifugal force.

With the above in mind, the invention provides a drive mechanism including a driving member having limited freedom for rotation with respect to the hub coaxially thereof, which driving member engages or is connected with the blades in a manner to impose a lagging moment thereon with respect to movement of the blade about the lag-lead pivot, which moment is sufficient to overcome the centrifugal restoring moment, even when driving the rotor at speeds substantially in excess of the normal autorotational value.

The invention also has in view the provision of braking means for the rotor, to be employed for slowing down rotation after a landing has been made, the said braking means also being constructed to transmit a lagging moment to the blade such that the blade pitch is reduced to the zero value upon application of braking torque, even when the rotor is rotating at normal flight speeds.

According to the invention, the braking mechanism is arranged to insure that the blade pitch shall be reduced to the minimum value prior to application of any substantial torque tending to slow down rotation of the rotor.

Another aspect of the invention involves the provision of blade movement controlling mechanism, especially for restricting or resisting pivotal blade displacements about the lag-lead axes, the controlling mechanism desirably being of the friction type and having substantially greater frictional resistance as to differential blade displacement than as to simultaneous or non-differential blade displacements. In this way effective control of differential blade displacement is provided for in normal flight operation and, at the same time, only relatively light resistance is applied when all of the blades lag simultaneously in response to the application of a driving or of a braking torque.

A further object of the invention is the provision of an additional pivot for each blade providing for "flapping" thereof, i. e., movement of the blade in a path generally transverse the mean rotative path of travel, which additional pivot is operatively interposed between the blade and the lag-lead pivot. By virtue of this arrangement the driving, braking, and blade movement controlling connections need not be constructed to accommodate blade flapping movement.

How the foregoing objects and advantages are obtained, together with others which will occur to those skilled in the art, will be apparent from the following description making reference to the accompanying drawings illustrating the preferred embodiment of the invention and in which—

Before discussing in detail the features illustrated in the drawings, it is pointed out that the craft incorporates a forward propulsion engine driving an airscrew for translation, drive mechanism being extended from the engine to the rotor to drive the latter for purposes of jump take-off. Such drive mechanism would preferably include a disconnectible clutch and also, if desired, a free wheeling or overrunning clutch.

Figure 1:
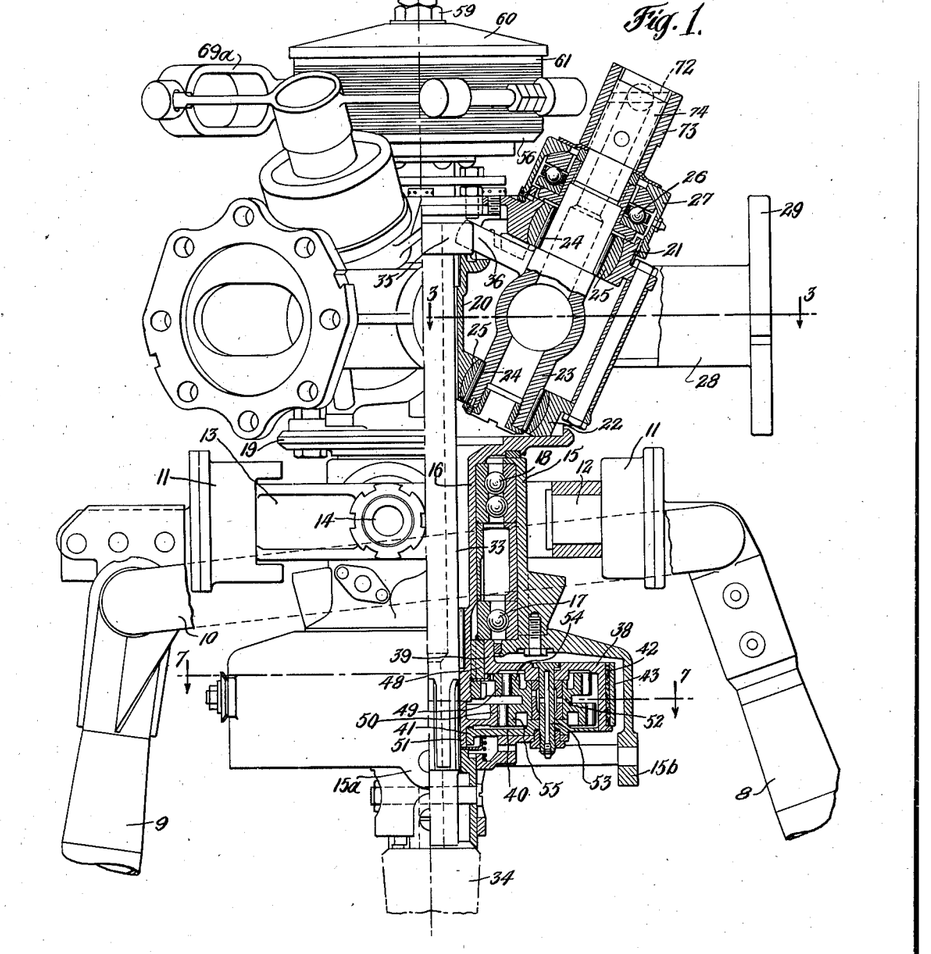
Fig. 1 is a side view partly in elevation and partly in vertical section of a rotor head and hub assembly incorporating the features of improvement hereinbefore mentioned.
Figure 2:
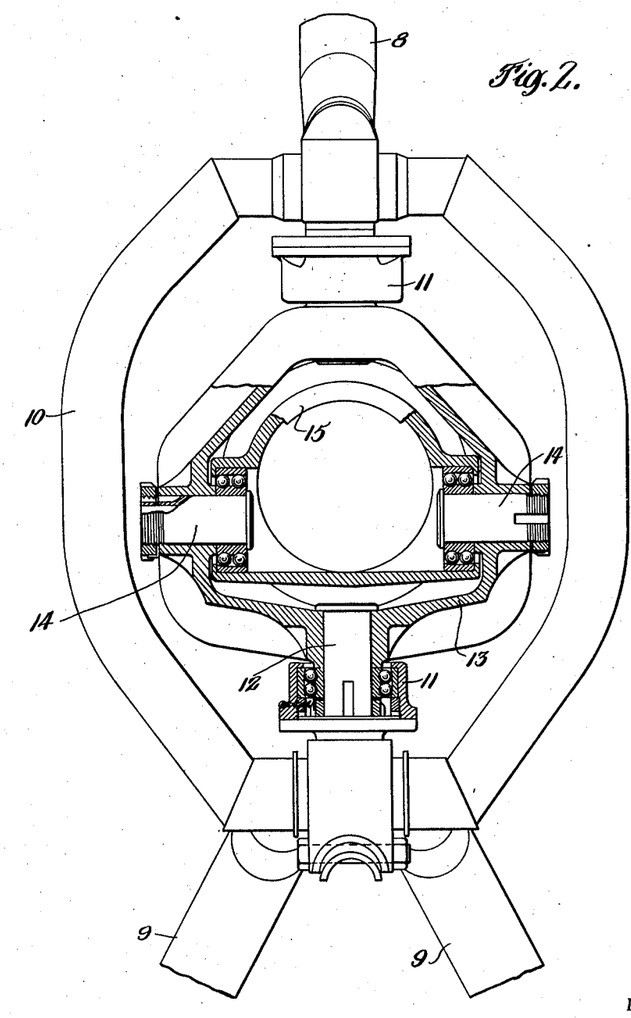
Fig. 2 is a horizontal plan view of certain parts of the rotor hub mounting, with portions in horizontal section.

Referring first to Figs. 1 and 2, the rotor head may be supported on the craft by any suitable fixed supporting elements, such as a pylon incorporating a single rear leg 8 and a pair of forward legs 9, these legs in turn carrying a fixed bracket or ring 10. Ring 10 in turn supports a pair of bearing housings 11 receiving trunnions 12 to provide for tilting movement of the gimbal ring 13 about a longitudinal axis. The ring 13 serves to support a pair of aligned trunnions 14 constituting a transverse tilting axis about which the casing 15 may rock, this casing being in the nature of a bearing supporting housing for the hub. The foregoing provision for tilting of the hub in all directions is employed for control purposes, i. e., control of flight maneuvers and the like, suitable lateral and longitudinal operating connections (not shown) being extended upwardly from the body of the craft to the hub housing for connection to the lugs or ears 15a and 15b. This type of control forms no part of the present invention per se and is therefore not illustrated and described in detail herein, the same being fully disclosed in copending application of Juan de la Cierva, Serial No. 645,985, filed December 6, 1932, corresponding to British Patent No. 393,976, accepted June 16, 1933.

The hub spindle, shown at 16 in Fig. 1, is journaled within the casing 15 by means of bearings 17 and 18. Toward its upper end the spindle is provided with a flange 19 to which the hub proper 20 is attached. The hub 20 carries pairs of apertured lugs 21—22, one pair for each blade incorporated in the rotor (three appearing in the form shown). Each pair of lugs serves to mount the lag-lead or "drag" pivot 23, the pivot being rotatively mounted by needle bearings 24 having a surrounding ring 25 with an outer spherical surface for alignment purposes. The axis of pivot 23 being inclined upwardly and outwardly with reference to the longitudinal axis of the blade, an end thrust is set up, this thrust being taken by bearing 26 and delivered to the hub proper 20 through the medium of a cap member 27.

Figure 3:
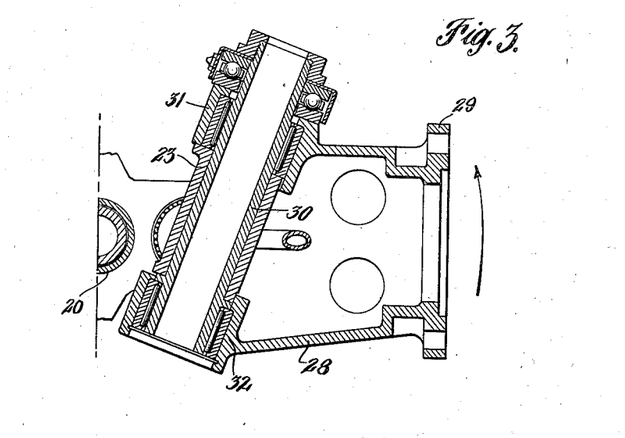
Fig. 3 is a sectional view taken substantially as indicated by the section line 3—3 applied to Fig. 1.

The blade root fitting 28 is flanged as at 29 for convenient attachment to the root end of the blade and the fitting is pivotally mounted on the pivot 23 by means of a flapping pivot 30, the axis of which intersects the axis of pivot 23 and also the longitudinal axis of the blade, as clearly appears in Fig. 1. The blade root member 28 is provided with opposed apertured bearing housings 31 and 32 which cooperate with the pivot 30 as best seen in Fig. 3 and the axis of pivot 30 is preferably inclined acutely to the longitudinal blade axis at the leading side thereof, the direction of rotation being indicated by the arrow in Fig. 3.

From the foregoing it will be seen that each blade is connected with the hub by means of a pivot 23 the axis of which is inclined upwardly and outwardly with respect to the longitudinal blade axis, such inclination providing for decrease of pitch upon lagging movement of the blade and increase of pitch upon the leading movement thereof, and further making possible direct or jump take-off in the general manner disclosed in copending application of Juan de la Cierva, Serial No. 738,349, filed August 3, 1934, corresponding to British Patent No. 420,322, accepted November 29, 1934. In contrast with the arrangement disclosed in said prior application, however, the inclination of the lag-lead pivot axis in accordance with the present invention more nearly approaches the perpendicular with respect to the longitudinal blade axis. The upward and outward angle of this pivot in accordance with the present invention is more than 45° from the longitudinal blade axis, when the latter is in true radial position, the purpose of this being to provide more stable lag-lead oscillation of the blade than is provided by a drag hinge the axis of which makes an angle substantially smaller than 45° with the longitudinal blade axis.

As hereinbefore indicated, however, the inclination of the drag pivot axis as preferred in accordance with the present invention requires a greater lagging displacement of the blade to produce a given reduction in pitch for driving purposes prior to effecting vertical take-off. This axis, moreover, is desirably offset from the axis of the hub and in consequence, at any substantial speed of rotation, the action of centrifugal force sets up a restoring moment tending to move illustration. Note that disks 63 have inwardly projecting tabs 64, the intermediate one of the three being provided with a sleeve 65 intervening between the upper and lower tabs 64, these elements being joined by a bolt 66 so that disks 63 are caused to move as a unit.

Figure 4:
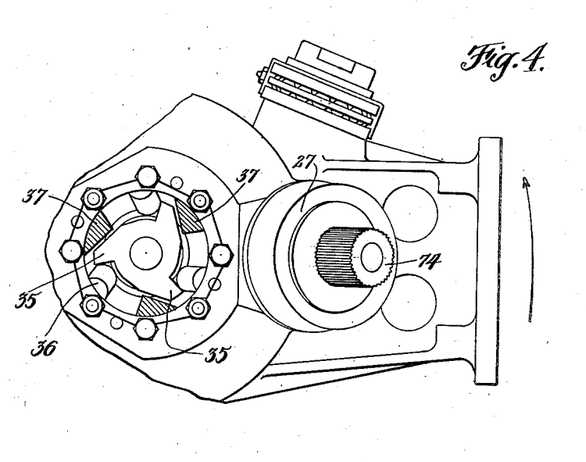
Fig. 4 is a fragmentary top plan view of a portion of the hub and certain pivot devices for connecting the blade thereto.
Figure 5:
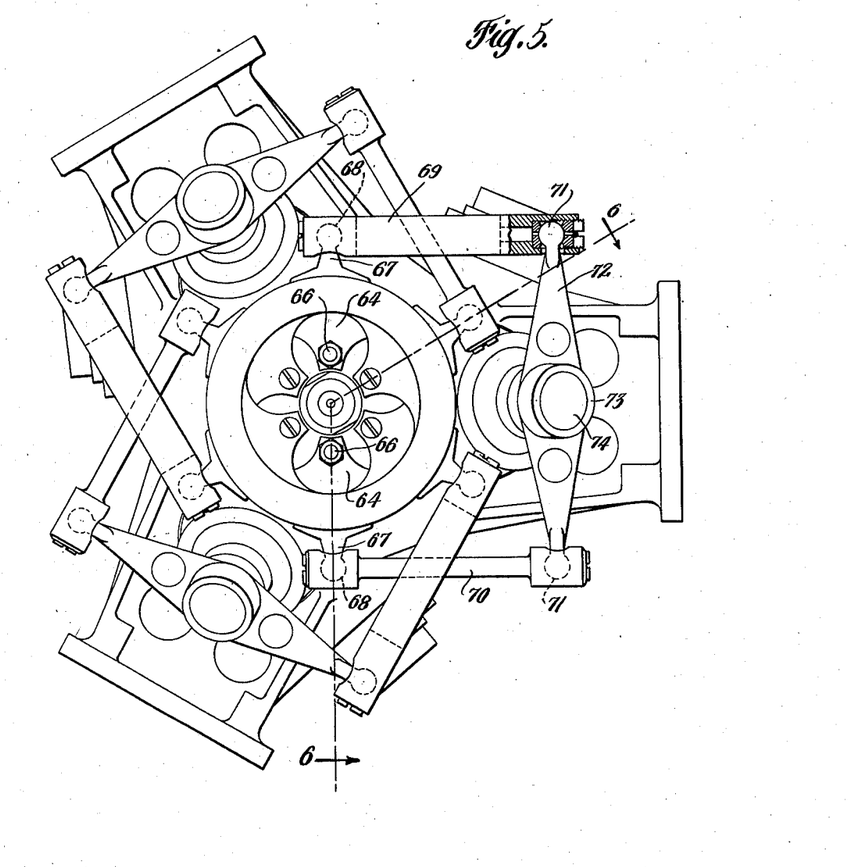
Fig. 5 is a plan view of the hub of Fig. 1.
Figure 6:
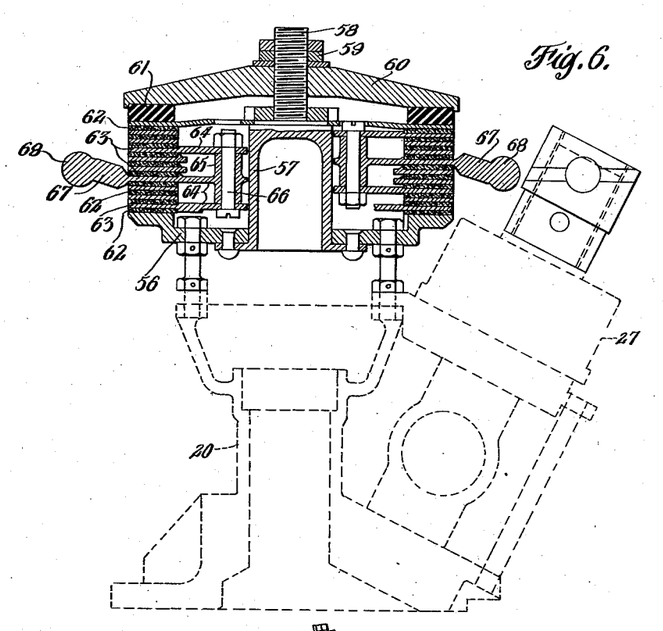
Fig. 6 is a vertical sectional view through certain portions of the rotor head assembly, this being taken substantially as indicated by the section line 6—6 appearing on Fig. 5.

From inspection of Fig. 5 it will be noted that tabs 64 are provided on the same disks (63) at a point diametrically opposite to the point appearing at the left of Fig. 6. In each group of disks, moreover, the intermediate disk is provided with outward extensions 67 (one at each side of the assembly) each having a ball 68 thereon for cooperation with a socket formed on link 69 or 70. The two links 69 and 70 project generally tangentially away from the damper assembly in parallel relation and are joined at their other ends by ball and socket connections 71 with the outer ends of the double-ended lever 72, having a central boss 73 which is non-rotatively mounted on the upper projection 74 (see Figs. 1 and 4) of the drag pivot 23.

The foregoing disk link and lever connections are duplicated for each one of the three blades of the rotor as will readily be apparent from examination of the several figures of the drawings, but a description of one such linkage system is believed sufficient. It may be noted, however, that the several disk projections 67 are arranged to extend, from the disks to which they are connected, in different directions in order to bring all of the ball and socket joints for the links 69 and 70 into a substantially common plane. To avoid interference between the various overlapping links 69 and 70 around the hub (see Fig. 5) certain of the links may be bent out of the common general plane thereof to pass the others, or, alternatively, alternate links (see, for instance, link 69a at the left of Fig. 1) may be apertured to pass a link for an adjacent blade.

It will be seen that by reason of the symmetrical disposition of the levers, links and arms transferring the motion from any one blade to the associated group of friction rings the reaction of said group of rings upon the hub is in the form of a pure couple acting in a plane perpendicular to the hub axis and that there is no resultant force of lateral reaction on the hub. In this way the transference to the controls of vibrations by the frictional interaction of the blades and the hub is avoided.

With further reference to the damper, it is observed that the grouping of the disks and inter-leaving thereof is such that each disk of each group lies adjacent to one disk of each of the other two groups, one being on one side and the other on the other side.

In operation, this blade movement controlling mechanism performs several important functions as follows:

In the first place, it provides a substantial frictional movement resisting lag-lead oscillation of the individual blades relative to each other. At the same time, the frictional moment resisting simultaneous and equal lagging or simultaneous and equal leading movement of all of the blades with respect to the hub is relatively low since, during this simultaneous movement, the entire stack of disks moves as a unit. This is of advantage in association with the driving and braking mechanism hereinbefore discussed, since the damper assembly at this time does not impose substantial restriction particularly of the lagging movement of the blades, in consequence of which the blades relatively freely move to the zero lift position.

In flight operation, in the event of simultaneous and equal lagging or leading of all the blades, no restriction whatever is imposed since the result of this action is merely a relative lagging or leading of the hub and blades together about the axis of rotation, i. e., and acceleration or deceleration of the rotor.

Still further, the low damping moment present in connection with simultaneous lagging and leading of all blades with respect to the hub provides relatively free return of the blades from maximum lagging position to a leading or radial position in response to the centrifugal restoring moment when the drive has been disconnected just prior to effecting take-off.

The arrangement of the flapping pivot 30 operatively outboard of the drag pivot 23 facilitates employment of the damper assembly of the character above described, since the connections to the damper need not be jointed to accommodate the blade movements in a plane transverse the mean rotative path of travel of the blades.

In summary it should be observed that the relative location of the flapping and drag pivots is of importance in facilitating employment of the improved driving, braking and damper mechanism already described in detail.

The invention also accomplishes the other objects hereinbefore referred to, including the positive attainment and maintenance of the desired low pitch value during driving and braking even when employing a drag hinge the axis of which makes a relatively large angle with the longitudinal blade axis (at the upper and outer side of the former), and even when the axis of the drag hinge is substantially offset from the hub axis.

I claim:

1. In an aircraft having a bladed sustaining rotor, mounting means for a blade providing for conjoint lagging and pitch reducing movement thereof with respect to the hub of the rotor, and driving mechanism for the rotor including a driving member having freedom for limited rotational movement with respect to the hub coaxially thereof and having driving connection with the blade imparting a lagging moment thereto with reference to movement of the blade on its mounting means.

2. In an aircraft having a bladed sustaining rotor, mounting means for a blade providing for conjoint lagging and pitch reducing movement thereof with respect to the hub of the rotor, and braking mechanism for the rotor operative upon application thereof to impart a lagging moment to the blade with reference to movement thereof on its mounting means.

3. In an aircraft having a bladed sustaining rotor, a pivot for mounting a blade, said pivot being inclined upwardly and outwardly with reference to the longitudinal blade axis to provide freedom for lag and lead movement of the blade accompanied by pitch variation with respect to the hub of the rotor, said pivot being offset from the axis of the rotor hub and the inclination of the pivot axis and the degree of offset thereof being such that at high rates of rotation of the rotor in driven through the hub only the action of centrifugal force on the blade would retain the blade close to its mid position of lag and lead oscillation, and driving mechanism for the rotor including a driving member having freedom for limited rotational movement with respect to the hub coaxially thereof and having driving conthe blade from a lagging position toward the midposition of oscillation, which restoring moment is of relatively great magnitude.

With a view to insuring that the blade remains in minimum pitch (maximum lagging) position special driving mechanism is employed, this mechanism including a central drive shaft 33 which may be universally joined at its lower end to a drive shaft 34 extended downwardly to the body of the craft and preferably coupled with the forward propulsion engine as a source of power. The driving member 33 has freedom for limited rotational movement within the hub, coaxially thereof and at its upper end carries projections 35 (one for each blade) extended to engage the inner ends of arms 36 which are rigid with the pivots 23. As clearly seen in Fig. 4, therefore, application of the starting torque causes the projections 35 to engage the arms 36 which imparts a lagging movement to the blades about the axes of pivots 23, this lagging movement being limited by the trailing faces of stops 37 preferably positioned at a point corresponding to zero lift incidence (minimum drag) of the blades. The leverage here provided for is sufficient to overcome the centrifugal restoring moment hereinbefore referred to, even during rotation of the rotor at speeds substantially in excess of the normal autorotational value.

The foregoing arrangement has a further advantage in that it insures equal lagging and equal interspacing of all blades during application of the starting torque.

Upon disconnection of the rotor drive clutch, the centrifugal restoring moment moves the blades from their lagging position to a somewhat leading position, or at least to an approximately mid-position so that the pitch of the blades is increased to utilize the kinetic energy stored in the rotor in effecting a jump take-off. This involves some overrunning of the hub proper with respect to the floating drive member, relative movement of the hub and the driving member in this direction being limited by engagement of the projections 35 with the leading faces of stops 37.

With further reference to the drive mechanism discussed above, attention is directed to the fact that the flapping pivot 30 is operatively interposed between the blade and the drag pivot 23. By virtue of this, the extension and connection of the floating driving member to the blade is greatly simplified, it being unnecessary to provide any special means for accommodating flapping movements of the blades.

Figure 7:
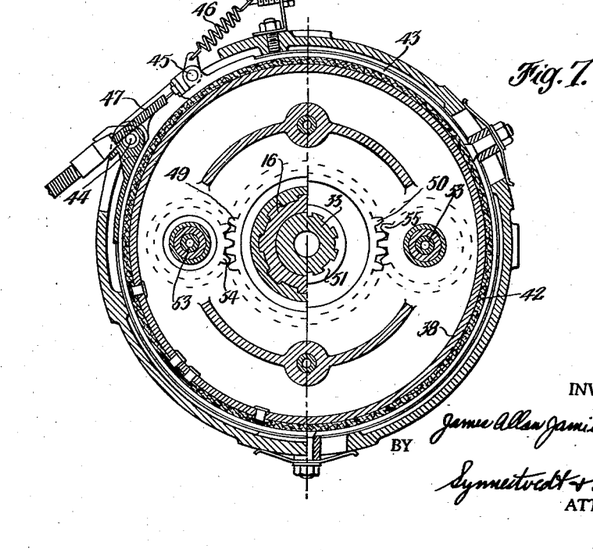
Fig. 7 is a horizontal sectional view taken as indicated by the section line 7—7 applied to Fig. 1.

As hereinbefore mentioned, the arrangement of this invention includes a brake mechanism of novel arrangement, described just below with particular reference to Figs. 1 and 7. This mechanism includes a brake drum 38, having a central sleeve 39 and a bottom closure member 40 formed with sleeve 41, by means of which sleeves (39 and 41) the brake drum is mounted with freedom for some rotation relative to the hub spindle 16. Around the outer surface of the cylindrical portion of the drum the usual friction material 42 is provided, and surrounding this, the contractible brake band 43 is arranged, as clearly appears in Fig. 7. One end of this band is fixed as at 44, the other end 45 being movable, a return spring 46 serving to release the brake, and a Bowden cable control 47 serving to apply it.

The braking reaction is transmitted from the drum 38 to the hub through sun and planetary gears, as follows:

The hub spindle 16 has a splined connection with collar 48, which collar is rigid with a sun gear 49. A second sun gear 50 is provided with a central collar 51 which is splined to the central drive shaft 33. One or more double planetary gears 52 are journaled in the drum by means of axis mechanism 53, each one of these planetary gears having two sets of teeth, one of which, 54, meshes with the sun gear 49 and the other of which, 55, meshes with the sun gear 50. From examination of Figs. 1 and 7 it will be noted that the two sets of teeth 54 and 55 of the planetary gears and the two sun gears 49 and 50 are of different radius, the sun gear 50 being smaller than the sun gear 49. By virtue of this arrangement, application of a braking torque to the drum 38 results in turning of the central drive shaft 33 with reference to the hub proper 20 and its spindle 16. In addition, by virtue of the foregoing, application of the braking force results in rotation of the central drive shaft in that direction in which the extensions 35 at the upper end thereof engage the arms 36 projecting inwardly from the drag pivots 23, so that application of the braking force causes the blades to move to low, preferably substantially zero, pitch position.

With regard to the foregoing functioning of the brake, it may be noted that reduction of the lift of the rotor to substantially zero value is ensured prior to any appreciable retarding force on the rotor. The rotor brake is normally applied by the pilot promptly upon landing, or alternatively it may be automatically applied by virtue of a connection between the brake control and an element of the undercarriage which contacts with the ground (as shown for example, in copending of Juan de la Cierva, Serial No. 59,293, filed Jan. 15, 1936, issued April 25, 1939 as Patent No. 2,155,409, corresponding to British Patent #452,397, accepted Aug. 17, 1936) and in either event it is obvious that there is an advantage in quickly "spilling" the rotor lift before any substantial braking effect is imposed upon the rotor; for if the weight of the machine is either fully or partially air-borne during the application of rotor braking torque, the machine may be thereby spun around or overturned.

To control or resist oscillations of the blades, especially in autorotative flight operation, the invention provides a central damper assembly surmounting the hub and provided with connections to the several blades. Features of this construction appear to best advantage in Figs. 1, 5 and 6. This damper consists of a base plate 56 having a central upward projection 57 carrying an upwardly extending threaded shank 58. Pressure adjusting nuts 59 are threaded on the shank 58 and serve to bear downwardly on the top member 60 between which and the base member 56 is arranged a stack of friction disks described below. A resilient or rubber ring 61 may be interposed between the cover member 60 and the top of the stack of disks.

The disks of this device are divided into three groups, each incorporating three disks which inter-leave with the disks of the other groups, friction material 62 being interposed between adjacent disks throughout the stack. For the description of the coupling of the disks of each group together and of the connections of such group to one of the blades, certain disks at the left side of Fig. 6 will be considered by way of nection with the blade imparting a lagging moment thereto sufficient to maintain the blade in a substantially lagging position against the action of centrifugal force even at said relatively high rates of rotation of the rotor.

4. In an aircraft having a bladed sustaining rotor, a pivot for mounting a blade, said pivot being inclined upwardly and outwardly with reference to the longitudinal blade axis to provide freedom for lag and lead movement of the blade accompanied by pitch variation with respect to the hub of the rotor, said pivot being offset from the axis of the rotor hub and the inclination of the pivot axis and the degree of offset thereof being such that at high rates of rotation of the rotor if driven through the hub only the action of centrifugal force on the blade would retain the blade close to its mid position of lag and lead oscillation, and braking mechanism for the rotor operative upon application thereof to impart a lagging moment to the blade sufficient to maintain the blade in a substantially lagging position against the action of centrifugal force even at said relatively high rates of rotation of the rotor.

5. In an aircraft having a bladed sustaining rotor, mounting means for a blade including a pivot having its axis inclined upwardly and outwardly with respect to the longitudinal blade axis to provide for decrease of blade pitch upon lagging movement of the blade, and driving mechanism for the rotor including a driving member having freedom for limited rotational movement with respect to the hub coaxially thereof and having driving connection with the blade imparting a lagging moment thereto with reference to movement of the blade on said pivot.

6. In an aircraft having a bladed sustaining rotor, mounting means for a blade including a pivot having its axis inclined upwardly and outwardly with respect to the longitudinal blade axis to provide for decrease of blade pitch upon lagging movement of the blade, and braking mechanism for the rotor operative upon application thereof to impart a lagging moment to the blade with reference to movement thereof on said pivot.

7. In an aircraft having a bladed sustaining rotor, mounting means for a blade including pivot means providing for conjoint lagging and pitch reducing movement thereof with respect to the hub of the rotor, the mounting means further including a pivot providing for swinging of the blade generally transverse its means rotative path of travel, which pivot is operatively interposed between the blade and the pivot means first mentioned, and driving mechanism for the rotor including a driving member having freedom for limited rotational movement with respect to the hub coaxially thereof and having driving connection with the blade imparting a lagging moment thereto with reference to movement of the blade on the first mentioned pivot means.

8. In an aircraft having a blade sustaining rotor, mounting means for a blade including pivot means providing for conjoint lagging and pitch reducing movement thereof with respect to the hub of the rotor, the mounting means further including a pivot providing for swinging of the blade generally transverse its mean rotative path of travel, which pivot is operatively interposed between the blade and the pivot means first mentioned, and braking mechanism for the rotor operative upon application thereof to impart a lagging moment to the blade with reference to movement thereof on the first mentioned pivot means.

9. In an aircraft having a multi-bladed sustaining rotor, mounting means for each blade including pivot means providing for conjoint lagging and pitch reducing movement thereof with respect to the hub of the rotor, and mechanism for controlling movement of the blade on said pivot means including a damper device common to all the blades of the rotor and providing restraint as to lag-lead movements of the blades, which restraint is greater as to differential lag-lead movements than as to non-differential lag-lead displacements.

10. In an aircraft having a multi-bladed sustaining rotor, mounting means for each blade including pivot means providing for conjoint lagging and pitch reducing movement thereof with respect to the hub of the rotor, mechanism for controlling movement of the blade on said pivot means including a damper device common to all the blades of the rotor and providing restraint as to lag-lead movements of the blades, which restraint is greater as to differential lag-lead movements than as to non-differential lag-lead displacements, and driving mechanism for the rotor including a driving member having freedom for limited rotational movement with respect to the hub coaxially thereof and having driving connection with the blade imparting a lagging moment thereto with reference to movement of the blade on said pivot means.

11. In an aircraft having a bladed sustaining rotor, mounting means for a blade including a pivot providing for lag-lead displacements of the blade with respect to the hub of the rotor and another pivot operatively interposed between the blade and said first pivot and providing freedom for displacements of the blade in a path generally transverse the rotative path of travel, and a blade movement controlling device surmounting the rotor hub and operatively connected with the blade inboard of said second pivot, whereby movements of the blade on said second pivot may take place without changing the relation of the parts interconnecting the blade and the blade movement controlling device.

12. In an aircraft having a sustaining rotor incorporating a hub and a plurality of blades, means for mounting each blade on the hub including a pivot providing for lag and lead displacements of the blade and a pivot providing for displacements of the blade in a path generally transverse the mean rotative path of travel thereof, the first pivot having its axis fixed with reference to the axis of the hub, and blade movement controlling mechanism common to the several blades of the rotor and connected with parts movable about the axes of said first pivots to resist pivotal movements of the blades thereon.

13. In an aircraft having a sustaining rotor incorporating a hub and a plurality of blades, means for mounting each blade on the hub including a pivot providing for lag and lead displacements of the blade and a pivot providing for displacements of the blade in a path generally transverse the mean rotative path of travel thereof, the first pivot having its axis fixed with reference to the axis of the hub, blade movement controlling mechanism common to the several blades of the rotor and connected with parts movable about the axes of said first pivots to resist pivotal movements of the blades thereon, the axes of said first pivots being obliquely inclined with respect to the longitudinal axes of the respective blades to provide for pitch change movement of the blades with lag and lead displacements thereof, and means for driving the rotor, the blade movement controlling mechanism providing a movement resisting moment which is greater with respect to differential lag-lead blade displacements than with respect to the non-differential lag-lead displacements.

14. In an aircraft having a sustaining rotor incorporating a hub and a plurality of blades, pivot means connecting the blades with the hub including for each blade a pivot whose axis is inclined upwardly and outwardly with respect to the longitudinal blade axis at an angle exceeding 45°, and mechanism for driving the rotor including a driving member coaxial with the hub and floating with respect thereto, the driving member having connections with the several blades transmitting a lagging moment thereto with respect to movement of the blade on said inclined pivot, which moment is sufficient to hold the blade in a substantially reduced pitch position as long as the rotor is being driven.

15. In an aircraft having a sustaining rotor incorporating a hub and a plurality of blades, pivot means connecting the blades with the hub including for each blade a pivot whose axis is inclined upwardly and outwardly with respect to the longitudinal blade axis at an angle exceeding 45°, mechanism for driving the rotor including a driving member coaxial with the hub and floating with respect thereto, the driving member having connections with the several blades transmitting a lagging moment thereto with respect to movement of the blade on said inclined pivot, which moment is sufficient to hold the blade in a substantially reduced pitch position as long as the rotor is being driven, and braking means for the rotor connected with the hub and the driving member and transmitting a moment tending to cause the driving member to overrun the hub and thus impose a lagging moment on the blade with respect to movement thereof on said inclined pivot.

16. In an aircraft sustaining rotor, a hub, a plurality of blades, pivot means for each blade including a pivot providing for lag-lead displacements thereof with respect to the hub, and mechanism for controlling lag-lead displacements of the blades including a friction damper device common to the several blades and incorporating a plurality of friction disks for each blade, the disks for the several blades being in interleaving relation to provide a greater frictional moment as to differential lag-lead blade displacements than as to non-differential lag-lead displacements.

17. In an aircraft sustaining rotor, a hub, a plurality of blades, pivot means for each blade including a pivot providing for lag-lead displacements thereof with respect to the hub, and mechanism for controlling lag-lead displacements of the blades including a friction damper device common to the several blades and incorporating a plurality of friction disks connected with the respective blades, the connection means between one of said disks and a blade comprising a pair of arms mounted for movement with the blade about the axis of its mounting pivot and a pair of links coupled with said arms and with said disks.

18. In an aircraft having a bladed sustaining rotor, mounting means for a blade providing for conjoint lagging and pitch reducing movement thereof with respect to the hub of the rotor, the mounting means including a blade mounting pivot whose axis is obliquely inclined upwardly and outwardly with respect to the longitudinal blade axis at an angle exceeding 45°, and driving mechanism for the rotor including a driving member having freedom for coaxially rotational movement with respect to the hub and having driving connection with the blade imparting a lagging moment thereto with reference to movement of the blade on its mounting means.

19. In an aircraft sustaining rotor, a hub, a plurality of blades, pivot means for each blade including a pivot providing for lag-lead displacements thereof with respect to the hub, and mechanism for controlling lag-lead displacements of the blades including a friction damper device common to the several blades and incorporating a plurality of friction disks connected with the respective blades, the connection means between one of said disks and a blade comprising a pair of arms mounted for movement with the blade about the axis of its mounting pivot and a pair of links coupled with said arms and with said disks, the said arms extending in opposite directions from the axis of the blade mounting pivot and the said links being respectively coupled with the said disks at diametrically opposite points of the latter.

20. In an aircraft sustaining rotor, a hub, a plurality of blades, pivot means for each blade including a pivot providing for lag-lead displacements thereof with respect to the hub, and mechanism for controlling lag-lead displacements of the blades including a friction damper device common to the several blades and incorporating a plurality of friction disks for each blade, the disks for the several blades being in interleaving relation.

21. In an aircraft having a bladed sustaining rotor, pivot means for a blade providing for conjoint lagging and pitch reducing movement thereof with respect to the hub of the rotor, and braking mechanism for the rotor including an element arranged coaxially of the hub and rotatable relatively thereto, at least to a limited extent, a braking member also rotatable on the hub, and differential gearing so connecting the braking member to the hub and to said element that on arrest of the braking member said element is caused to overrun the hub, said element having connection with the blade imparting a lagging moment to the blade when the element overruns the hub.

22. In an aircraft having a bladed sustaining rotor, mounting means for a blade providing for conjoint lagging and pitch reducing movement thereof with respect to the hub of the rotor, driving mechanism for the rotor including a driving member having freedom for limited rotational movement with respect to the hub coaxially thereof and having driving connection with the blade imparting a lagging moment thereto with reference to movement of the blade on its mounting means, and rotor braking means including a braking member rotatable on the hub and differential gearing so connecting the braking member to the hub and to the driving member that on arrest of the braking member the driving member is caused to overrun the hub for imparting a lagging moment to the blade with reference to movement thereof on its mounting means.

23. In an aircraft having a bladed sustaining rotor, mounting means for a blade providing for conjoint lagging and pitch reducing movement thereof with respect to the hub of the rotor, driving mechanism for the rotor including a driving member having freedom for limited rotational movement with respect to the hub coaxially thereof and having driving connection with the blade imparting a lagging moment thereto with reference to movement of the blade on its mounting means, a larger sun-wheel mounted on the hub and a smaller sun-wheel mounted on the driving member, a planetary cage carrying planetary wheels each having two sets of teeth respectively meshing with the said larger and smaller sun-wheels, and braking means for arresting the said planetary cage to cause the driving member to overrun the hub and impart a lagging moment to the blade with reference to movement thereof on its mounting means.

JAMES ALLAN JAMIESON BENNETT.